United States Patent [19]

Abbes et al.

[11] 4,400,018
[45] Aug. 23, 1983

[54] PIPE COUPLING

[75] Inventors: Claude Abbes, St. Etienne; Christian Rouaud, Bourg Saint Andeol; Robert Forges, Bollene; Raymond de Villepoix, Donzere, all of France

[73] Assignee: Commissariat A L'Engergie Atomique & Socitet Brachier et Fils, Paris, France

[21] Appl. No.: 208,231

[22] Filed: Nov. 13, 1980

[30] Foreign Application Priority Data

Dec. 3, 1979 [FR] France .................................. 79 29657

[51] Int. Cl.³ .............................................. F16L 21/06
[52] U.S. Cl. ........................................ 285/31; 285/373
[58] Field of Search ................. 285/373, 367, 366, 31, 285/32, 298, 365

[56] References Cited

U.S. PATENT DOCUMENTS

| 1,607,943 | 11/1926 | Carson et al. |
| 2,028,182 | 1/1936 | Barnichol, Jr. ................. 285/367 X |
| 2,341,164 | 2/1944 | Shimek. |
| 2,738,993 | 3/1956 | Wilson ............................ 285/298 X |
| 3,231,298 | 1/1966 | Tomb et al. |
| 3,603,618 | 9/1971 | Stratton ................................ 285/31 |
| 4,147,383 | 4/1979 | Schluter ............................. 285/373 |

FOREIGN PATENT DOCUMENTS

| 610674 | 3/1935 | Fed. Rep. of Germany ........ 285/32 |
| 64127 | 5/1955 | France .............................. 285/373 |
| 1372390 | 8/1964 | France. |
| 458854 | 8/1968 | Switzerland. |
| 430676 | 6/1935 | United Kingdom. |
| 840715 | 7/1960 | United Kingdom. |
| 1546777 | 5/1979 | United Kingdom ................ 285/367 |

Primary Examiner—Thomas F. Callaghan
Attorney, Agent, or Firm—Kerkam, Stowell, Kondracki & Clarke

[57] ABSTRACT

Pipe coupling comprising two flanges which can be fixed to the ends of the pipes and clamping means which bear on the flanges to sealingly connect the same, wherein the clamping means comprise an extensible member located between the flanges and defining a passage providing a communication between the pipes and at least one movable member controlling the elongation of the extensible member to make it sealingly bear against the flanges, the movable member bearing on the rear face of the flanges to prevent the moving apart thereof during the elongation of the extensible member.

8 Claims, 4 Drawing Figures

PIPE COUPLING

BACKGROUND OF THE INVENTION

The invention relates to a device for sealingly connecting two pipes, said device comprising clamping means bearing on two flanges which, for example, by welding to the facing ends of the pipes.

Numerous connecting or coupling devices of this type are known. In particular, they include altered flange assemblies and couplings with welded end fittings.

In the case of bolted flange assemblies the gasket is either located in a groove formed on the front face of one of the flanges, or is directly secured between the front faces of the flanges. In both cases, locking is brought about by means of bolts or any similar locking or tightening means. When the gasket is positioned in a groove, its fitting and removal make it necessary to move the two flanges apart by a distance substantially equal to the gasket thickness. When the gasket is placed directly between the two flanges, the spacing of the flanges must slightly exceed the gasket thickness in order to permit the fitting thereof.

In the case of couplings with welded conical end fittings, the gasket is fitted by moving apart the two end fittings by a distance equal to the width of the self-centering device of the gasket and the end fittings.

Moreover, in all the known coupling devices, the locking of the gasket is brought about by moving together the two flanges or the two end fittings, for example, by means of locking bolts.

In all the prior art devices, the flanges fixed to the ends of pipes must therefore undergo a number of different movements, both during the introduction and removal of the gaskets and during the tightening of the coupling. These movements lead to stresses in the pipes or the casings of equipment inserted in the circuit. These stresses can be absorbed by using relatively flexible pipes having elbows or expansion bends making it possible to compensate the flange movements. However, it is not always possible to use such pipes and consequently it is not always possible to use the conventional coupling devices. Moreover, even when it is possible to give the pipes a construction and configuration permitting compensation of the movements which have to be carried out by the flanges, these special pipe characteristics make the circuit more complicated and significantly increase costs.

BRIEF SUMMARY OF THE INVENTION

The present invention relates to a pipe coupling device not having the disadvantages of the prior art devices and which can in particular be used in any circuit without requiring any modification of the pipes. Thus, the coupling device according to the invention requires no measurable displacement of the flanges, even during the introduction of the gaskets or during the tightening of the coupling.

To this end, the present invention proposes a pipe coupling device comprising two flanges which can be fixed to the ends of the pipes and clamping means which bear on the flanges to sealingly connect the same, wherein the clamping means comprise an extensible member located between the flanges and defining a passage providing a communication between the pipes and at least one movable member controlling the elongation of the extensible member to make it sealingly bear against the flanges, the movable member bearing on the rear face of the flanges to prevent the moving apart thereof during the elongation of the extensible member.

As a result of the characteristics of the invention described hereinbefore, the coupling device is not tightened by moving together the flanges as in the case of the prior art devices. Instead, the device according to the invention is tightened by elongating an extensible member between the flanges whilst keeping the latter at a constant spacing. Thus, the gaskets providing the necessary sealing between the flanges can be fitted or removed without modifying the spacing between the flanges. In the same way, the device can be tightened without any significant displacement of the flanges.

According to another feature of the invention, the extensible member comprises at least two elements which move with respect to one another, each of them having a conical mating surface and the movable member comprises an intermediate portion having two opposite conical surfaces which bear against the conical mating surfaces so as to move the two elements of the extensible away from one another when the movable member is radially displaced towards the axis of the flanges under the action of the clamping device. Preferably, the movable member also has two terminal portions defining two planar surfaces perpendicular to the axis of the flanges and which bear on the rear faces of the latter.

According to a first embodiment of the invention, the movable member comprises two half-shells, each having in section said intermediate portion and said terminal portions. The locking and maintaining in position of the device can be carried out either by means of bolts positioned between the half-shells, or by means of an external tool such as a clip or jack and in this case the half-shells are maintained in the moved-together position by suitable locking means.

According to a second embodiment of the invention, the movable member comprises a plurality of articulated chain links defining an open chain, each of these chain links having in section said intermediate portion and said terminal portions, the clamp being tightened by means of a tensioning device positioned between the ends of the chain.

According to another feature of the invention, the extensible member comprises a tubular element, whose internal diameter is substantially equal to the internal diameter of the flanges in order to define the passage connecting the pipes. The two movable elements are then slidingly mounted on the tubular element to bring an O-ring into tight contact with the corresponding flange during the elongation of the extensible member. Preferably, the O-rings are positioned in an annular space defined between the outer surface of the tubular member, a bevelled surface formed on the movable member and the front face of the flange.

According to yet another feature of the invention, each of the flanges has at least one projecting portion defining a cradle in which is placed the extensible member. This arrangement is particularly advantageous when the pipes are located in an inaccessible place requiring, for example, the use of a manipulating device.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
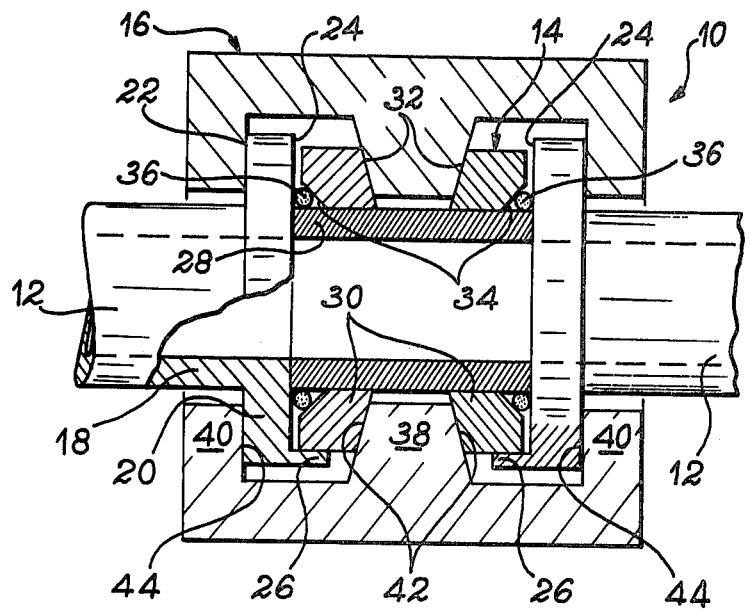
FIG. 1 a longitudinal sectional view of the pipe coupling device according to the invention.

The coupling device 10 shown in longitudinal sectional form in FIG. 1 comprises two flanges 12 which are to be sealingly fixed to the facing ends of two pipes to be connected together and which are not shown in the drawing and tightening means constituted by an extensible member 14 and a movable member 16 controlling the elongation of the extensible member 14.

Each of the flanges 12 is preferably fixed by welding to the corresponding pipe. Each flange has a tubular portion 18 and a radial portion 20, the latter defining a rear face 22 and a front face 24. As illustrated in FIG. 1, the front faces 24 of the flanges are separated by a distance adequate for the insertion of the extensible member 14. Each of the radial portions 20 also has on its face 24 one or more projecting portions 26 defining a cradle in which is placed the extensible member 14. This arrangement facilitates the positioning of member 14 and, if applicable, enables a blind manipulation of said member.

According to the invention, the extensible member 14 comprises a tubular member 28, whose length is substantially equal to or slightly less than the distance separating the front faces 24 of the flanges and whose internal diameter is substantially equal to the internal diameter of flanges 12 and the corresponding pipes. Two identical movable members 30 are slidingly mounted on each of the ends of tubular member 28. Members 30 are in the form of rings, whose facing faces are inclined so as to define identical frustum-shaped bearing surfaces 32. The opposite face of each of the members 30 has a bevelled surface 34 on its inner periphery. Surface 34 defines with the outer surface of tubular member 28 and with the front face 24 of the corresponding flange an annular space having a triangular cross-section in which is placed on O-sealing ring 36.

Figure 2:
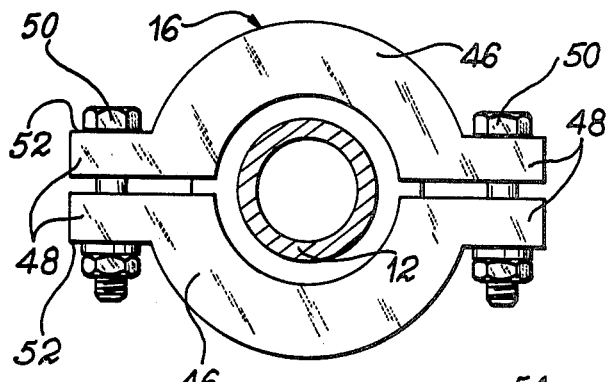
FIG. 2 an end view of a variant of a first embodiment of the coupling device shown in section in FIG. 1.
Figure 4:
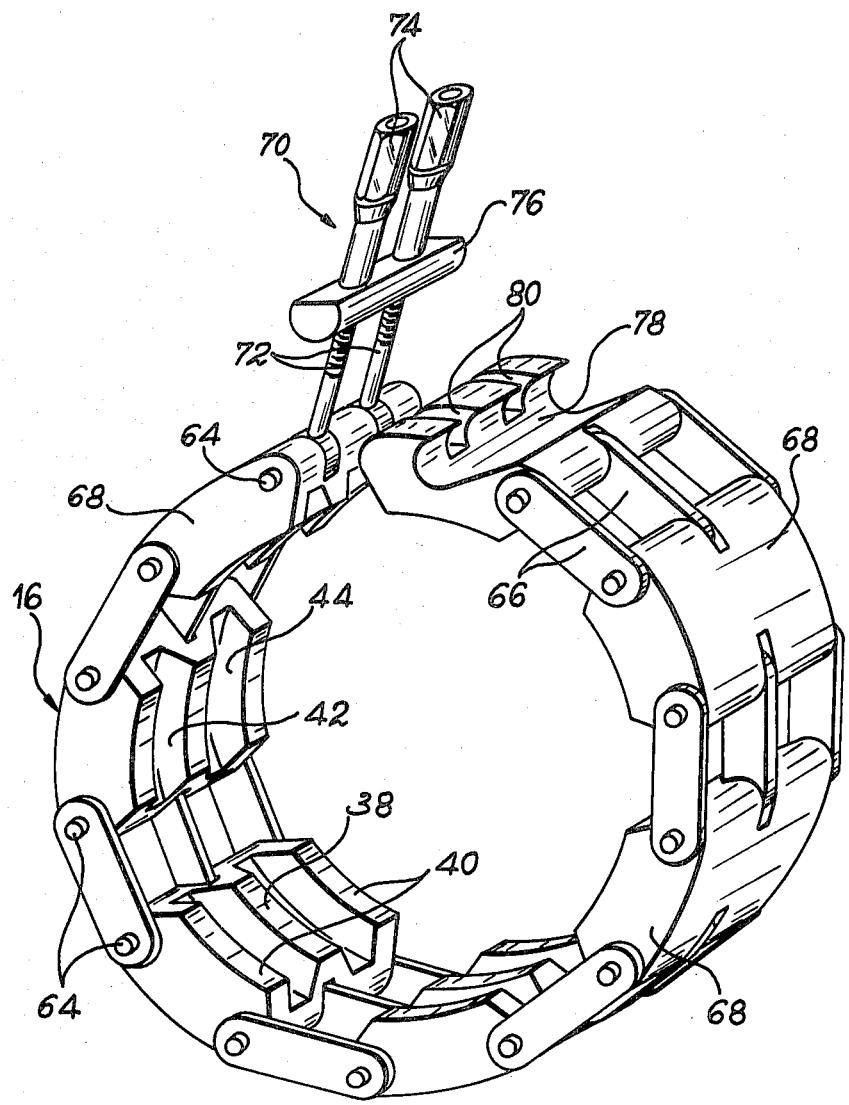
FIG. 4 a perspective view of a chain clamping collar which can be used in the coupling device of FIG. 1 according to a second embodiment of the invention.

As will be seen in greater detail with respect to FIGS. 2 and 4, the movable member 16 can have different constructional shapes as a function of the number of parts forming the same and as a function of the nature of the device used for tightening and locking said parts. However, no matter what constructional shape is adopted for member 16, each of the parts forming the same or at least certain of said parts, have a clearly defined shape in longitudinal section along the coupling axis.

Thus, as illustrated in FIG. 1, movable member 16 has an intermediate portion 38 and two terminal portions 40 which project towards the inside. Intermediate portions 38 define two opposite defined frustum-shaped surfaces 42 which bear on the frustum-shaped bearing surfaces 32 formed on members 30. Moreover, each of the terminal portions 40 facing the frustum-shaped surface 42 of intermediate portion 38 define a planar surface 44 perpendicular to the axis of flanges 12. The spacing between the planar surfaces 44 is substantially equal to the distance separating the rear faces 22 of flanges 12, in such a way that the latter bear against the terminal portions 40 when the different parts of the movable member 16 are displaced radially inwards. As will be shown hereinafter, this radial displacement causes the tightening of the coupling by moving members 30 towards flanges 12 by a wedging effect as a result of the frustum-shaped surfaces 42 bearing against the frustum-shaped bearing surfaces 32. The spacing of the members 30 compresses the O-rings 36 between the bevelled surfaces 34, the outer surface of tubular member 28 and the front faces 24 of the flanges. This ensures the sealing of the coupling device according to the invention.

According to the invention, through the bearing of rear faces 22 of flanges 12 and the planar surfaces 44 of terminal portions 40, during the tightening of the device the spacing of members 30 causes no measurable displacement of flanges 12.

Figure 3:
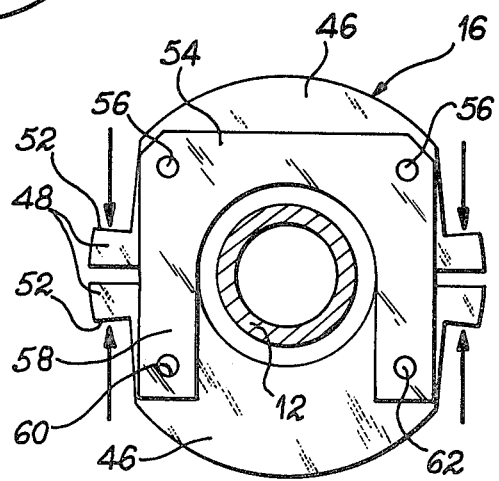
FIG. 3 an end view of another variant of an embodiment shown in FIG. 2.

According to a first embodiment of the invention, two variants of which are shown in FIGS. 2 and 3, the movable member 16 comprises two half-shells 46, each provided with two lugs 48 making it possible to move together the half-shells by means of an appropriate tightening device.

In the variant of FIG. 2, the tightening device is constituted by two bolts 50 or any similar means bearing against the opposite surfaces 52 of lugs 48 so as to permit the tightening of the device through the moving together of half-shells 46. This movement leads to a radial and inwardly directed displacement of intermediate portions 38, which brings about the moving apart of members 30 and the compression of the O-rings 36 against the faces 24 of the flanges. Bolts 50 also fulfil a locking function, because they keep the device in position when tightening has been completed.

In the variant of FIG. 3, tightening is brought about by means of a suitable tightening or clamping tool, such as a clip or jack which can bear against the opposite direct surfaces 42 formed on lugs 48. The tightening action exerted by this tool is diagrammatically shown by the arrows in FIG. 3. In this variant, the tightening device is external of the coupling device, so that it is necessary to provide on the latter locking means which keep the coupling in the tightened or clamped position. The locking means can be constituted by a semi-rigid metal sheet 54 fixed to each of the ends of one of the half-shells 46, for example by means of screws diagrammatically represented at 56. Each sheet 54 has arms 58 extending on either side of the corresponding flange 12 in order to engage with the terminal face of the other half-shell 46. Each of the arms 58 has a circular opening 60 in which engages a contact stud 62 projecting over the terminal face of the other half-shell 46, when the coupling device is tightened. In order to facilitate fitting, the free ends of arms 58 are preferably inwardly curved away from the terminal faces of the half-shells, which makes it easier for sheet 54 to bend when arms 58 come level with the contact studs 62 during tightening.

According to the second embodiment shown in FIG. 4, the movable member 16 is constituted by an open clamping collar comprising a series of chain links 68 which are articulated to one another by means of pins 64 and on which are positioned link members 66. Thus, each of the chain links 68 is connected to adjacent links by three link members 66, whereof two are positioned on either side of the chain links, whilst the third is positioned approximately in the median plane defined by the chain links. One of the chain links 68 defining one of the ends of the chain carries a tightening device 70 constituted by two threaded rods 72 articulated on one of the pins 64 of the chain link, two nuts 74 received on the threaded rods 72 and a rounded support bar 76 displaced by nut 74 along threaded rod 72. The chain link 68 defining the other end of the chain has on its outer surface a hook-shaped portion 78 and two slots 80 made in the end of hook 78.

As illustrated in FIG. 4, when the tightening device 70 pivots about pin 64, bar 76 engages in hook 78 and threaded rods 72 pass through the slots 80. It is clear that the tightening of the clamping collar is then easily formed by moving the support bar 76 along the threaded rods 72 so as to bring together the collar ends by means of nuts 74. As in the variant of FIG. 2, the tightening device 70 is carried by the movable member 76 in such a way that it ensures both the tightening of the coupling device and the locking of the latter in the tightened position.

Obviously, the invention is not limited to the embodiments described hereinbefore in exemplified manner and instead covers all variants. Thus, the number of constituent parts of movable member 16 has no influence on the invention, provided that all or at least some of them distributed in preferably a uniform manner has a portion such as intermediate portion 38 making it possible to control the elongation of the extensible manner 14 and portions such as terminal portions 40 making it possible to keep the flanges 12 in position during the elongation of said member. In addition, the construction of the extensible member 14 and the means permitting the control of its elongation can be modified without passing beyond the scope of the invention.

What is claimed is:

1. A pipe coupling comprising two flanges which can be fixed to the ends of the pipes and a tightening device which bear on the flanges to sealingly connect the same, wherein the tightening device comprises an extensible member located between the end front faces of the flanges in such a way that said member can be fitted and removed without modifying spacing between said front faces and defining a passage providing a communication between the pipes, said tightening device further comprising at least one movable member controlling the increase of length of the extensible member to make it sealingly bear against the front faces of the flanges, the movable member further having terminal portions bearing on the rear face of the flanges to prevent the moving apart of said flanges during the increase of length of the extensible member, wherein the extensible member comprises at least two elements which move with respect to one another, each of them having a conical mating surface and the movable member comprises an intermediate portion having two opposite conical surfaces which bear against the conical mating surfaces so as to move the two elements of the extensible member away from one another when the movable member is radially displaced towards the axis of the flanges under the action of the tightening device wherein the extensible member also comprises a tubular member, whose internal diameter is substantially equal to the internal diameter of the flanges in order to define the said passage, the two movable elements being slidingly mounted on the tubular member in order to bring an O-ring into tight contact with the corresponding flange during the elongation of the extensible member.

2. A device according to claim 1, wherein said terminal portions of the movable member define two planar surfaces perpendicular to the axis of the flanges and which bear on the rear faces of the flanges.

3. A device according to claim 1, wherein the movable member comprises two half-shells, each having in section said intermediate portion and said terminal portions.

4. A device according to claim 3, including bolts positioned between half-shells in order to bring them together and maintain them in position.

5. A device according to claim 3, including locking means being provided between the half-shells to maintain them in the close-together position.

6. A device according to claim 1, wherein the movable member comprises a plurality of articulated chain links defining an open chain, each of the said chain links having in section said intermediate portion and said terminal portions, and a tensioning device positioned between the ends of the chain.

7. A device according to claim 1, wherein each O-ring is located in an annular space defined between the outer surface of the tubular member, a bevelled surface formed on the movable element and the front face of the flange.

8. A device according to claim 1, wherein each of the flanges has on its front face at least one projecting portion defining a cradle receiving the extensible member.

* * * * *

UNITED STATES PATENT AND TRADEMARK OFFICE
CERTIFICATE OF CORRECTION

PATENT NO. : 4,400,018
DATED : August 23, 1983
INVENTOR(S) : Claude ABBES; Christian ROUAUD; Robert FORGES; and Raymond de VILLEPOIX It is certified that error appears in the above-identified patent and that said Letters Patent are hereby corrected as shown below:

Please change the Assignee from "Commissariat A L'Engergie Atomique & Socitet Brachier et Fils" to --Commissariat A L'Energie Atomique--

Signed and Sealed this

Seventh Day of February 1984

[SEAL]

Attest:

GERALD J. MOSSINGHOFF

Attesting Officer

Commissioner of Patents and Trademarks